F. A. SWEET AND G. G. JAMIESON.
COALING BARGE.
APPLICATION FILED NOV. 1, 1919.
1,344,459. Patented June 22, 1920.
5 SHEETS—SHEET 5.
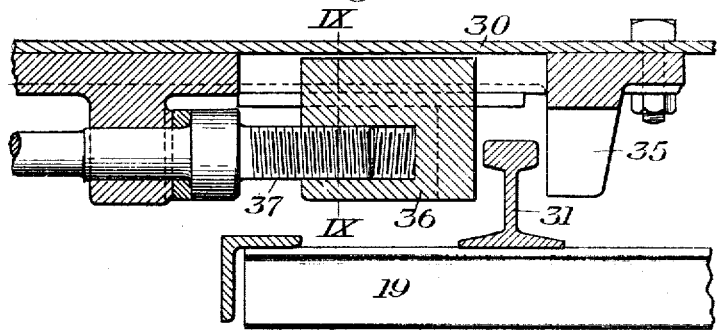
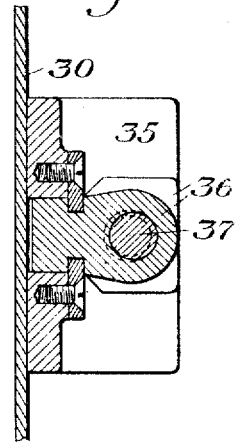
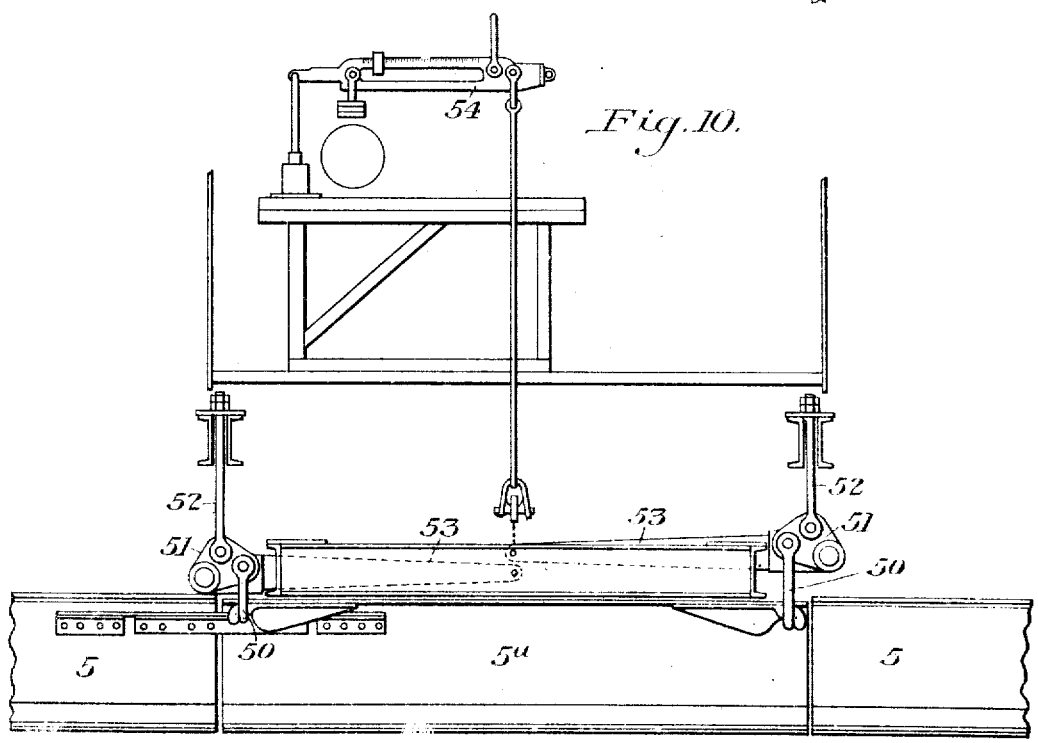

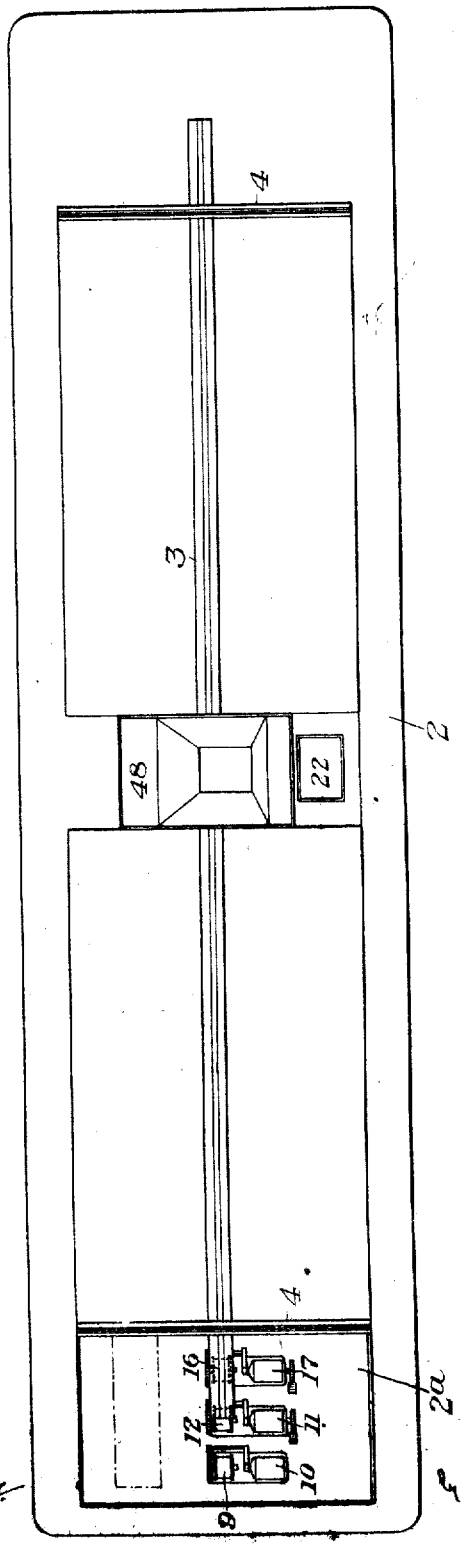

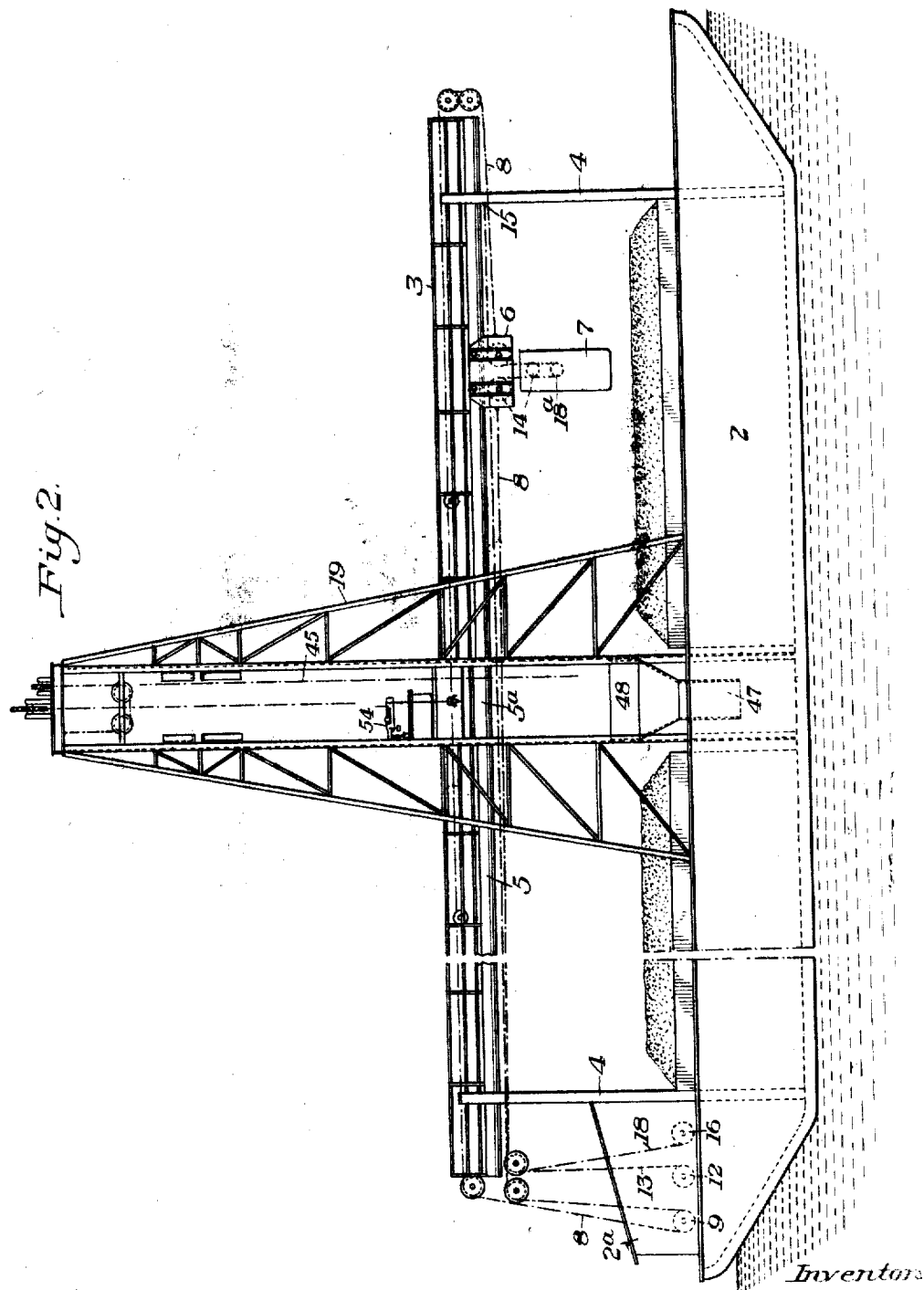

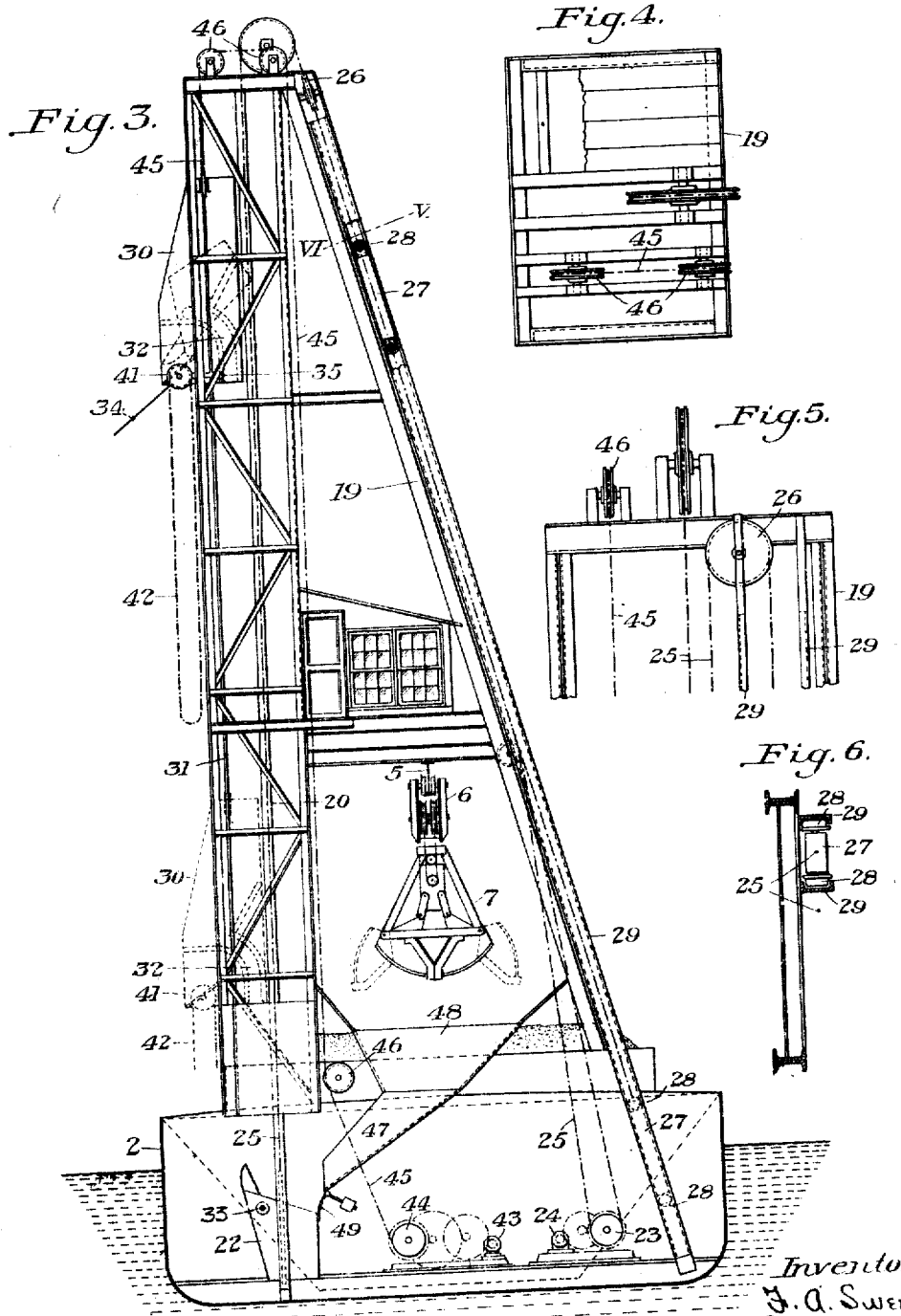

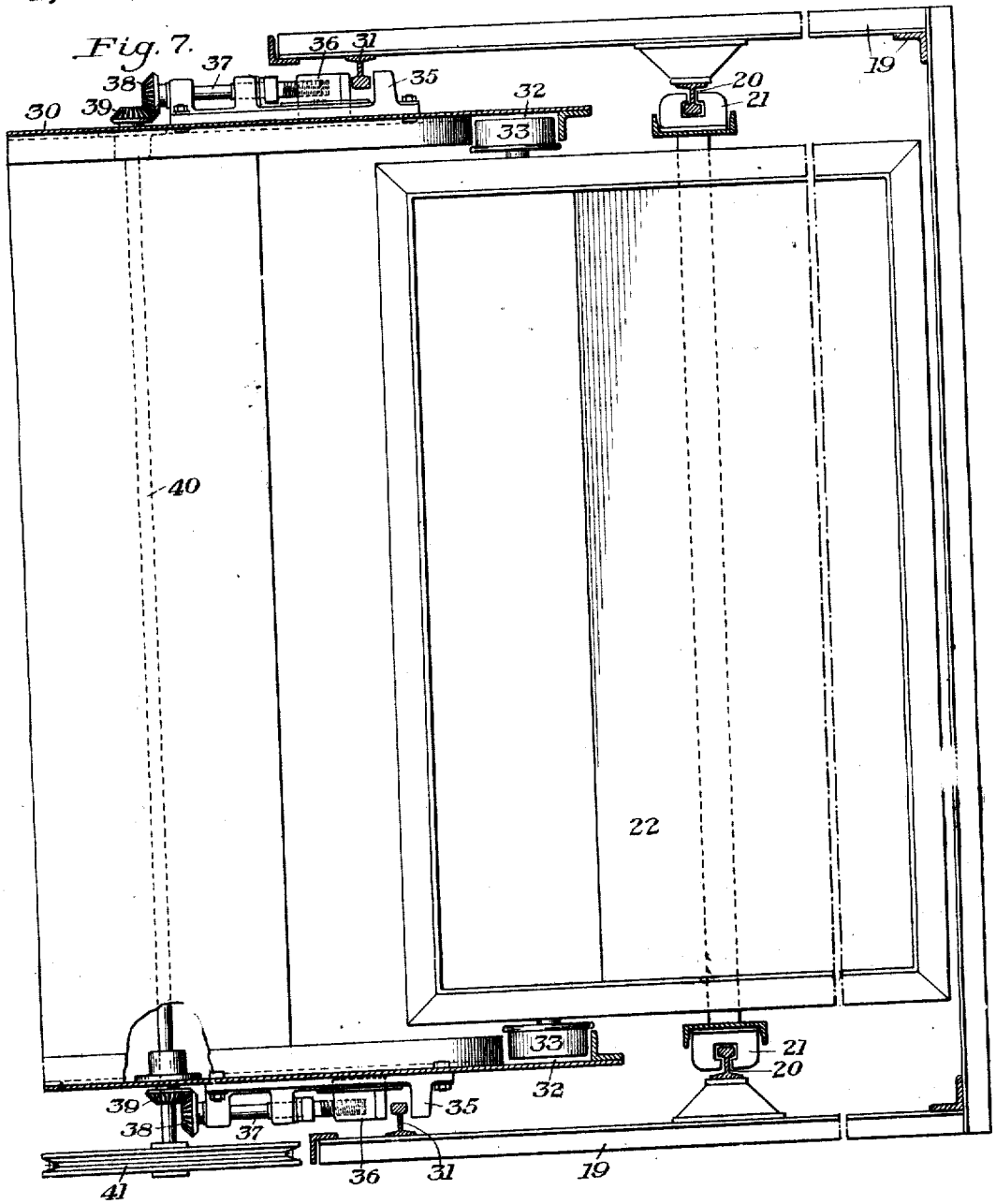

UNITED STATES PATENT OFFICE.

FREDERICK A. SWEET, OF SALT LAKE CITY, UTAH, AND GEORGE G. JAMIESON, OF OAKLAND, CALIFORNIA.

COALING-BARGE.

1,344,459.        Specification of Letters Patent.     Patented June 22, 1920.

Application filed November 1, 1919. Serial No. 334,988.

*To all whom it may concern:*

Be it known that we, FREDERICK A. SWEET, a citizen of the United States, residing at Salt Lake City, in the county of Salt Lake and State of Utah, and GEORGE G. JAMIESON, a citizen of the United States, residing at Oakland, in the county of Alameda and State of California, have invented a new and useful Improvement in Coaling-Barges, of which the following is a full, clear, and exact description, reference being had to the accompanying drawings, forming part of this specification, in which:—

Figure 1 is a plan view, largely diagrammatic, showing a barge equipped with our invention.

Fig. 2 is a side elevation of the same.

Fig. 3 is a view partly in end elevation and partly in transverse vertical section.

Fig. 4 is a plan view partly broken away of the top portion of the tower.

Fig. 5 is a side elevation of the upper end portion of the tower.

Fig. 6 is a section on the line VI—VI of Fig. 3.

Fig. 7 is a sectional plan view on a larger scale, and showing the means for dumping the skip or hoist.

Fig. 8 is a detail sectional view of one of the clamps for the dumping guide.

Fig. 9 is a section on the line IX—IX of Fig. 8, and

Fig. 10 is a side elevation showing the weighing scale.

Our invention has relation to barges for coaling ships and is designed to provide a coaling barge having mechanism arranged for quickly and conveniently transshipping coal from the barge to the ship with a minimum of spillage.

Our invention also provides mechanism of this character which is readily adapted to coaling ships of different heights and which is free from swinging booms or bucket carriers overhanging the deck of the ship to be coaled. While the invention has been particularly designed for the purpose above described, we do not, of course, limit its use to handling coal, as it might be used for transferring other material.

The nature of our invention will be best understood by reference to the accompanying drawings in which we have shown a preferred embodiment thereof and which will now be described, it being premised, however, that various changes can be made in the details of construction, arrangement and combination of the various parts without departing from the spirit and scope of our invention as defined in the appended claims.

In these drawings the numeral 2 designates a coaling barge. 3 designates an elevated bridge extending longitudinally of the barge for at least a major portion of its length, and which is supported upon suitable frame work 4. This bridge supports the longitudinally extending trolley rail 5 upon which travels a carriage or trolley 6, from which is suspended a grab bucket 7 of any suitable character. The carriages may be caused to traverse the rail 5 by any suitable means, such as a cable or a similar flexible member 8, whose ends are connected to opposite sides of the carriage (see Fig. 2) and which is shown as being actuated by a drum 9 driven by an electric motor 10. 11 designates a second electric motor having a drum 12 around which passes a cable 13. This cable is looped over suitable sheaves 14 on the trolley 6 and bucket 7, and is dead-ended on the frame at 15, thus providing means for raising and lowering the bucket. A third drum 16 driven by an electric motor 17 actuates the cable 18 which is looped over a pulley 18ª on the bucket 7 and is also dead-ended to the frame at 15 thus providing means whereby the bucket may be opened and closed. Bucket actuating mechanism of this character is in general well known. In the drawings we have shown the three motors 10, 11 and 17 with their drums as being located in a compartment 2ª at one end portion of the barge.

19 designates a tower structure erected on the barge, preferably at about the central portion thereof, and which is provided with vertically extending guide rails 20 loosely engaged by suitable shoes 21 of a skip or hoist bucket 22. This skip or hoist bucket is arranged to be raised and lowered by means of a drum 23 (see Fig. 3) actuated by an electric motor 24, and around which passes a cable 25. One end of this cable is connected to the skip or hoist bucket and the other end passes upwardly and around a sheave 26 at the upper portion of the tower and thence downwardly to a counterweight 27. This counterweight is provided with guide wheels 28 which engage inclined tracks 29 (see Figs. 3 and 6) on the tower. The counterweight is preferably somewhat heavier than the empty skip or hoist bucket, but somewhat lighter than the filled bucket.

The bucket 22, which travels vertically on the guide rails 20, is arranged to be dumped at any desired height by tipping the bucket or skip over at such an angle as to permit the contents to flow out of said bucket into the movable and adjustable chute or hopper 30 now to be described. This hopper or chute is mounted on suitable guide rails 31 installed in said tower 19, and may be raised to any suitable position, or at any desired height, in said tower by means of the hoisting engine and rope or cable, and may be held in any such position by means of suitable clamping devices such as presently to be described. The hopper or chute 30 is provided at opposite sides with upwardly and laterally grooved trackways 32 which are designed to be engaged by wheels 33 on the hoist or skip bucket 22 in the manner best shown in Fig. 7. As will be readily seen from this figure in connection with Fig. 3, as the bucket or hoist is raised to a position where the wheels 33 enter the trackways 32, the bucket will be tipped, in the manner indicated in the upward dotted position in Fig. 3, to discharge its contents, this discharge being onto any suitable chute, such as indicated at 34, which extends into the hatchway of the ship to be coaled.

In order to hold the dumping chute in the desired vertical position, the frame 30 is provided with suitable clamps. These may consist of the fixed clamp members 35 and the movable jaws 36 (see Figs. 7, 8 and 9), the latter being engaged by threaded shafts 37 carrying beveled gear wheels 38 which mesh with similar wheels 39 on a transverse shaft 40 carrying a chain wheel 41 over which is looped a chain 42. The chute is raised and lowered by means of a motor 43 actuating a drum 44 around which winds a cable 45. This cable is carried upwardly over suitable guide wheels 46 and thence downwardly to the guide frame to which it is connected.

In operation the clamps are first loosened, the motor 43 is then operated to raise and lower the chute to the desired position, and the chain 42 is then actuated to set the clamps and lock the frame in the adjusted position.

The bucket 22, when in its lowered position, receives its charge from the discharge chute 47 of a hopper 48 arranged at the central portion of the barge in a well at the base of the tower. This hopper in turn receives its charge from the bucket 7. 49 designates a suitable guard for insuring the proper discharge from the chute 47 into the bucket 22.

We preferably provide means whereby each load of coal taken by the grab bucket 7 will be weighed before being dumped into the hopper 48. For this purpose the track rail 5, where it extends through the tower 19, is provided with a vertically movable section 5ª (see Fig. 10) which is suspended by links 50 having lever members 51 which are in turn suspended from the frame by the links 52. The lever members 51 are arranged to actuate the beams 53 which are, in turn, connected to the scale beam 54. The particular scale mechanism herein shown forms no part of our invention, being of a well known character; and we may use any suitable scale mechanism operatively connected to the vertically movable track section 5ª.

The operation will be readily understood. The coaling barge is brought alongside the ship to be coaled; the hopper or chute 30 is properly adjusted with respect to the best location of the chute 34; and the bucket 7 is actuated to pick up and discharge successive loads of coal into the hopper 48, and thence into the skip or hoist 22. The latter, each time it is loaded, is elevated and dumped in the described manner into the chute 34 which, in turn, discharges directly into the hold of the ship.

The advantages of our invention will be apparent since it provides a coaling barge in which the entire load of the barge can be readily transferred to a ship by the operation of conveying and hoisting mechanism of simple character. The various motors can be readily controlled in any known manner from the operator's cab which is preferably located, as indicated in Fig. 3, on the tower 19. From this position the operator can readily see and control all the operations. The apparatus is free from swinging booms, conveyers, or other load carriers which move above the deck of the vessel to be coaled. This greatly reduces danger of accidents due to spillage and falling lumps of coal, and also reduces to a minimum the spilling of coal onto the deck of the ship. By means of the scale, an accurate record may be kept of the amount of coal delivered.

The barge may not only be used in the manner described for discharging cargo from the barge to other boats, but may also be used for transferring cargo from boats to a wharf or into railroad cars alongside. There are many places where a cargo-carrying ocean steamship cannot come alongside a wharf because of insufficient depth of water. In such cases our improved barge may be used to great advantage in having a cargo of coal, stone, sand or gravel, or other material, unloaded from the steamship onto the barge. The barge can then proceed to the wharf and its cargo unloaded onto the dock or into railroad cars or bunkers.

It will, of course, be understood that while we have shown electric motors for the purpose of operating the moving parts of the barge, any other suitable power may be employed.

We claim:

1. A coaling barge provided with a longitudinally extending bridge having a track thereon, a trolley mounted for longitudinal movement on said track, a grab bucket carried by said trolley, a tower located at an intermediate portion of the bridge, a skip or hoist bucket mounted for vertical travel in said tower, means for delivering the material from the grab bucket to the skip or hoisting bucket, and means for dumping the skip or hoisting bucket when elevated, substantially as described.

2. A coaling barge provided with a longitudinally extending bridge having a track thereon, a trolley mounted for longitudinal movement on said track, a grab bucket carried by said trolley, a tower located at an intermediate portion of the bridge, a skip or hoist bucket mounted for vertical travel in said tower, means for delivering the material from the grab bucket to the skip or hoisting bucket, and means for dumping the skip or hoisting bucket when elevated, together with weighing means on said bridge, substantially as described.

3. A coaling barge provided with a longitudinally extending bridge having a track thereon, a trolley mounted for longitudinal movement on said track, a grab bucket carried by said trolley, a tower located at an intermediate portion of the bridge, a skip or hoist bucket mounted for vertical travel in said tower, means for delivering material from the grab bucket to the skip or hoist bucket, and means for dumping the skip or hoist bucket when elevated, together with means whereby the bucket may be caused to dump at different heights, substantially as described.

4. The combination of a barge provided with a longitudinal extending structure or bridge having a track thereon, a trolley arranged for longitudinal travel on said track, a grab bucket carried by said trolley, a tower located at an intermediate point of said barge and on one side thereof between said bridge and the side of said barge; a skip or hoist bucket mounted on suitable tracks for vertical travel in said tower, a chute for delivering by gravity the material discharged by the grab bucket to the skip or hoisting bucket when in its lowered position, means for elevating said skip or hoist bucket, and means for dumping same, and a movable or adjustable hopper and chute combined in which the bucket is dumped, said combined hopper or chute being also mounted in said tower or tracks for vertical movement, substantially as described.

5. The combination of a barge, provided with a longitudinally extending bridge having a track thereon, a trolley mounted for longitudinal movement on said track, a grab bucket suspended from said trolley by means of flexible cables and carried by said trolley, said track having a vertically movable section, scales connected to said movable track section for weighing said grab bucket, a hopper and chute into which the contents of the grab bucket is discharged, a tower located at an intermediate point on said bridge and near one side thereof, a skip or hoist bucket mounted in said tower on suitable tracks for vertical travel and arranged when in its lowered position to receive the material from the chute into which said grab bucket discharges; said tower also having another set of tracks upon which is mounted for vertical travel a combination hopper and chute with dumping devices attached thereto and having also means for locking or clamping the same at any desired height in said tower determined upon; said dumping device having means for engaging, tilting and dumping said skip or hoisting bucket upon its being elevated to a height sufficient to engage therewith, substantially as described.

6. A barge having a bridge extending longitudinally thereof, a track on said bridge, a trolley arranged to travel on said track, a tower through which the track extends, said track having a vertically movable section at said tower, weighing means connected to said movable track section, hoisting and dumping mechanism mounted on the tower, a bucket carried by said trolley, and means for delivering the material to be handled from said bucket to the hoisting and dumping means, substantially as described.

7. A barge having a bridge extending longitudinally thereof, conveying mechanism arranged to travel on said bridge, a stationary tower located at an intermediate portion of the barge and to the base of which material may be delivered from both end portions of the barge, a hoisting bucket on said tower, and means for dumping said bucket when raised, substantially as described.

8. A barge having a bridge extending longitudinally thereof, a track on said bridge, a trolley arranged to travel on said track, a tower through which the track extends, said track having a vertically movable section at said tower, weighing means connected to said movable track section, hoisting and dumping mechanism mounted on the tower, a bucket carried by said trolley, and means for delivering the material to be handled from said bucket to the hoisting and dumping means, substantially as described.

In testimony whereof we have hereunto set our hands.

FREDERICK A. SWEET.
GEORGE G. JAMIESON.